(12) United States Patent
Umekawa

(10) Patent No.: US 9,839,848 B2
(45) Date of Patent: Dec. 12, 2017

(54) DISPLAY MANAGEMENT APPARATUS, PROGRAM, AND DISPLAY MANAGEMENT METHOD

(75) Inventor: Tomoharu Umekawa, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 762 days.

(21) Appl. No.: 13/991,736

(22) PCT Filed: May 11, 2012

(86) PCT No.: PCT/JP2012/062093
§ 371 (c)(1),
(2), (4) Date: Jun. 5, 2013

(87) PCT Pub. No.: WO2013/008521
PCT Pub. Date: Jan. 17, 2013

(65) Prior Publication Data
US 2013/0271367 A1    Oct. 17, 2013

(30) Foreign Application Priority Data
Jul. 13, 2011 (JP) ................................ 2011-155131

(51) Int. Cl.
*G06F 3/0484* (2013.01)
*G06F 3/01* (2006.01)
(Continued)

(52) U.S. Cl.
CPC ............. *A63F 13/63* (2014.09); *G06F 3/01* (2013.01); *G06F 3/0482* (2013.01); *G06F 3/04847* (2013.01); *A63F 2300/308* (2013.01)

(58) Field of Classification Search
CPC ............ G06F 3/048–3/04897; A63F 2300/308
See application file for complete search history.

(56) References Cited

U.S. PATENT DOCUMENTS

2003/0233430 A1* 12/2003 Hill, Jr. ................ G06F 9/5061
709/221
2004/0107160 A1* 6/2004 Goclowski ......... G06Q 30/0601
705/37
2008/0005210 A1* 1/2008 Covington ........ G06F 17/30554
708/200

FOREIGN PATENT DOCUMENTS

JP       2007-114844 A     5/2007
JP       2008-15737 A      1/2008
(Continued)

OTHER PUBLICATIONS

"Updated Celebrity Rings." Diamond Jewelry Forum. PriceScope27, May 27, 2011. Web. Dec. 8, 2015. <http://web.archive.org/web/20110527105808/http://www.pricescope.com/forum/jewelry-pieces/updated-celebrity-rings-t75052.html>.*
(Continued)

*Primary Examiner* — Jennifer To
*Assistant Examiner* — Liang Li
(74) *Attorney, Agent, or Firm* — Sughrue Mion, PLLC

(57) ABSTRACT

A controller causes a display unit to display N candidate values selected from natural numbers in a target range having a predetermined base value as the maximum value, as candidates to be selected by a user. The controller selects M values that are multiples of a plurality of different reference values, from among the natural numbers in the target range as candidate values, and causes the display unit to display a candidate value list that lists N candidate values that include the M values.

12 Claims, 12 Drawing Sheets

(51) Int. Cl.
*A63F 13/63* (2014.01)
*G06F 3/0482* (2013.01)

(56) References Cited

FOREIGN PATENT DOCUMENTS

JP   2008-52386 A    3/2008
JP   2010-108055 A   5/2010

OTHER PUBLICATIONS

"Skill Reimbursement." EVElopedia The Eve Online Wiki. EveOnline, Jun. 2, 2010. Web. Dec. 8, 2015. <http://web.archive.org/web/20100702162823/http://wiki.eveonline.com/en/wiki/Skill_Reimbursement>.*

Barzeski, Erik J. "IPhone UI Development Question." Nslog. Nslog.com, Nov. 3, 2008. Web. Apr. 14, 2016. <http://nslog.com/2008/11/03/iphone_ui_development_question>.*

Application Style vol. 2, a social game information magazine, published by East Press Co. Ltd., Apr. 1, 2011, pp. 26-29 (written in Japanese).

* cited by examiner

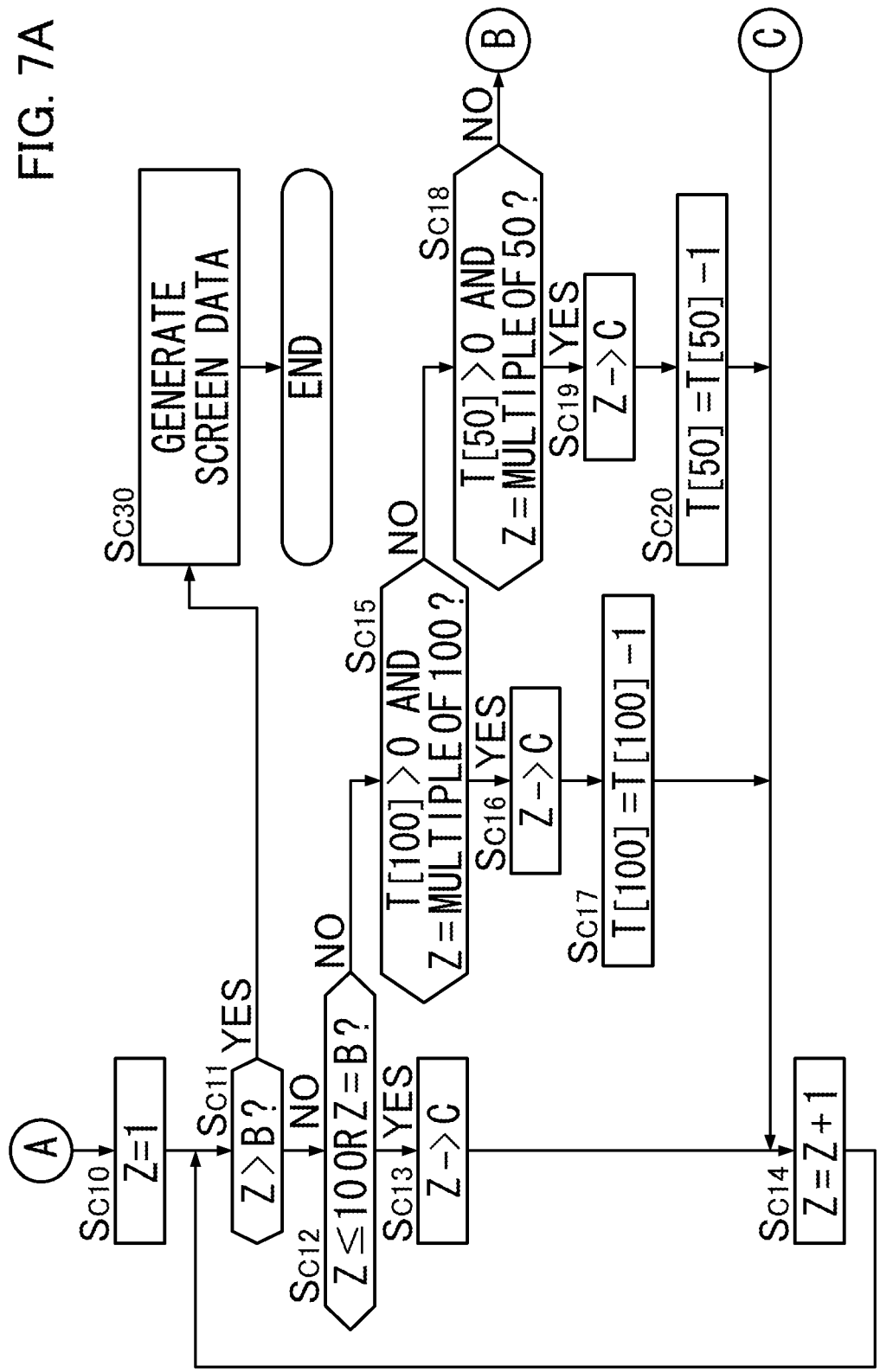

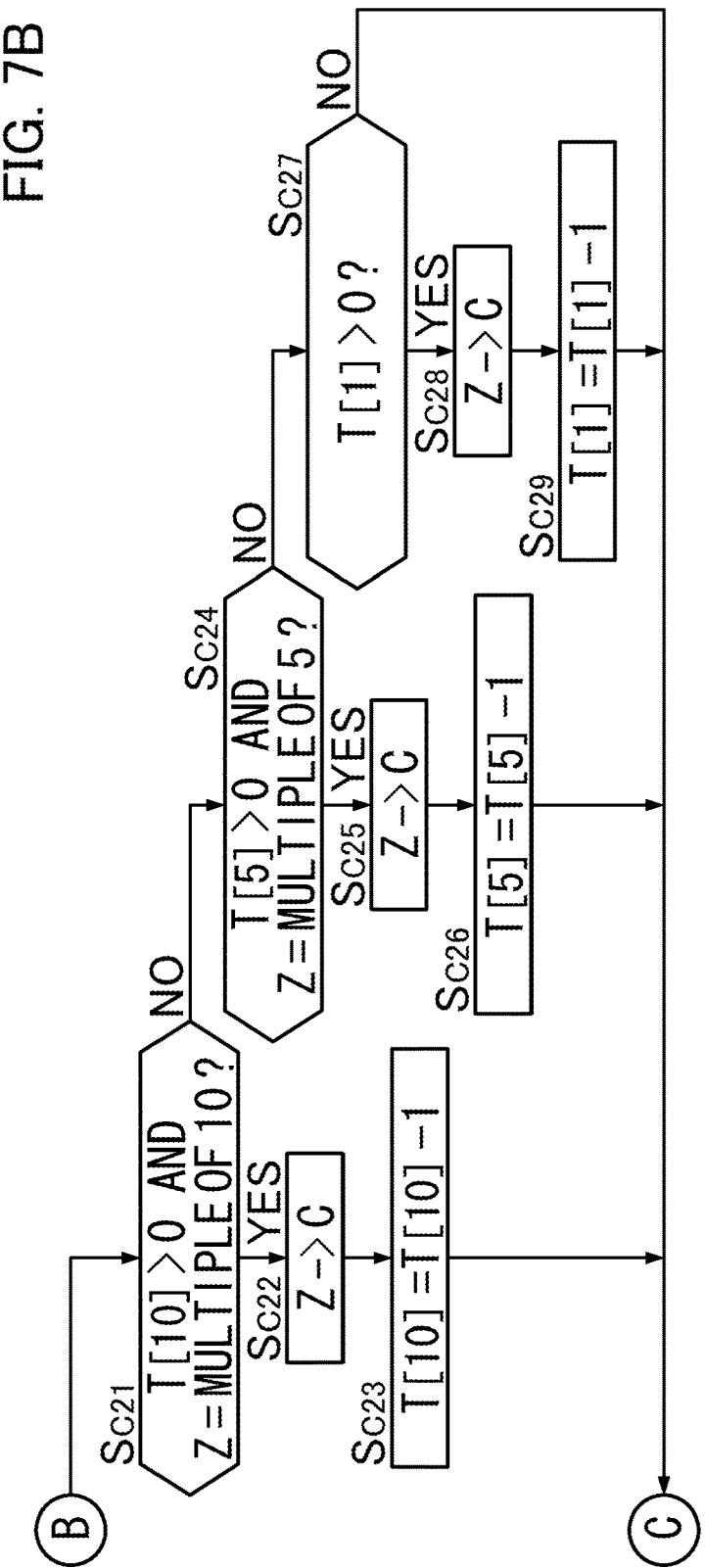

FIG. 8A

B = 38  --- T[100] = 0 , T[50] = 0 , T[10] = 2 , T[5] = 2 , T[1] = 0
→ C = { $\underbrace{1,2,3,4,5,6,7,8,9,10}_{r1}, \underbrace{15,20,25,30}_{r3}, \underbrace{38}_{r2}$ }

FIG. 8B

B = 176  --- T[100] = 1 , T[50] = 2 , T[10] = 1 , T[5] = 0 , T[1] = 0
→ C = { $\underbrace{1,2,3,4,5,6,7,8,9,10}_{r1}, \underbrace{20,50,100,150}_{r3}, \underbrace{176}_{r2}$ }

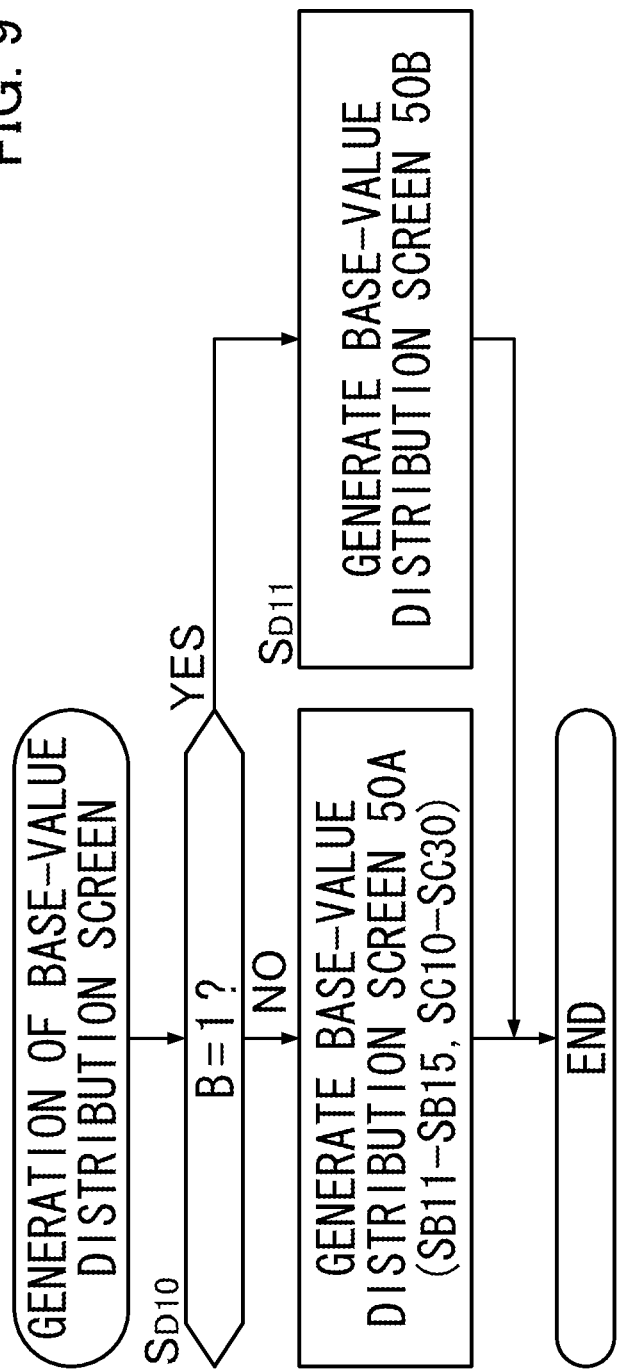

DISPLAY MANAGEMENT APPARATUS, PROGRAM, AND DISPLAY MANAGEMENT METHOD

CROSS REFERENCE TO RELATED APPLICATIONS

This application is a National Stage of International Application No. PCT/JP2012/062093, filed on May 11, 2012, which claims priority from Japanese Patent Application No. 2011-155131, filed on Jul. 13, 2011, the contents of all of which are incorporated herein by reference in their entirety.

TECHNICAL FIELD

The present invention relates to technologies for displaying a plurality of numerical values as candidates to be selected by a user.

BACKGROUND ART

In various situations, a user selects one of a plurality of numerical values displayed on a display apparatus. For example, Non-Patent Document 1 proposes a game in which the user (player) distributes, in a desired manner, a numerical value (hereafter called a base value) given to the user when the user accomplishes various types of events, to parameters in the game, such as health points and attack power. More specifically, a list of numerical values (hereafter called candidate values) in the range having the base value as the maximum value is displayed on a display unit, and a candidate value selected from the list by the user by operating an input unit is added to the parameter.

CITATION LIST

Non-Patent Document

Non-Patent Document 1: Application Style Vol. 2, a social game information magazine, published by East Press Co. Ltd., Apr. 1, 2011, pp. 26-29 (written in Japanese)

SUMMARY OF INVENTION

Technical Problem

If all natural numbers in the range having the base value as the maximum are displayed in a list, however, since the list includes a great number of candidate values when the base value is large, it is difficult for the user to select one desired candidate value from the list. In addition, because portable units, such as portable telephones, have limited types and functions of input devices (for example, a pointing device, such as a mouse, cannot be used), the above-described problem, which requires the user to perform troublesome work to select a desired candidate value, becomes more serious. Taking these situations into consideration, an object of the present invention is to improve the level of convenience when the user selects one of a plurality of candidate values.

Solution to Problem

A display management apparatus of the present invention causes a display unit to display N candidate values selected from integers in a target range having a predetermined base value as the maximum value, as candidates to be selected by a user. The display management apparatus includes a first selection section that selects a predetermined number of values that are multiples of a plurality of different reference values, from among the integers in the target range as candidate values, and a display control section that causes the display unit to display a candidate value list that lists N candidate values that include the predetermined number of values selected by the first selection section.

It is preferable that the plurality of reference values include multiples of 5. In other words, multiples of 5 are selected with priority as candidate values among the integers in the target range.

It is preferable that the display management apparatus further include a second selection section that selects one integer in a first range that includes 1, which is the minimum value in the target range, as a candidate value, and the display control section cause the display unit to display the candidate value list that lists N candidate values that include the values selected by the first selection section and the value selected by the second selection section.

It is also preferable that the display management apparatus further include a second selection section that selects all of a plurality of integers in a first range that includes 1, which is the minimum value in the target range, as candidate values, and the display control section cause the display unit to display the candidate value list that lists N candidate values that include the values selected by the first selection section and the values selected by the second selection section.

It is preferable that the display management apparatus further include a third selection section that selects integers in a second range that includes the base value in the target range, as candidate values, and the display control section cause the display unit to display the candidate value list that lists N candidate values that include the values selected by the first selection section and the values selected by the third selection section. For example, the third selection section selects only the base value as a candidate value.

It is preferable that the display management apparatus further include a value management section that manages the value of each of a plurality of types of variables serving as distribution destinations of the base value; the display control section cause the display unit to display a value selector and a value confirmer for each of the plurality of types of variables in a state in which the user can specify, and when the user specifies the value selector, to display the candidate value list; and when the user specifies the value confirmer, the value management section add a candidate value selected from the candidate value list by the user to the variable corresponding to the value confirmer.

It is preferable that the display management apparatus further include a determination section that determines whether the base value is a predetermined value; the display control section cause the display unit to display the value selector and the value confirmer for each of the variables when the result of the determination made by the determination section is negative, and to display, for each of the variables, a unit value adder that adds the predetermined value to the variable when the result of the determination made by the determination section is affirmative; and when the user specifies the unit value adder, the value management section add the predetermined value to the variable corresponding to the unit value adder among the plurality of variables.

The present invention can also be applied to a program for causing a computer to function as a display management apparatus according to each of the foregoing aspects of the present invention. A program according to the present invention causes a computer to, in order to cause a display unit to display N candidate values selected from integers in a target range having a predetermined base value as the maximum value, as candidates to be selected by a user, function as a first selection section that selects a predetermined number of values that are multiples of a plurality of different reference values, from among the integers in the target range as candidate values; and a display control section that causes the display unit to display a candidate value list that lists N candidate values that include the predetermined number of values selected by the first selection section. The program of the present invention is stored in a computer-readable recording medium, is provided for the user in that form, and is installed in a computer. Alternatively, the program of the present invention is distributed through a communication network from a server and is installed in a computer.

The present invention can also be applied to a display management method for causing a display unit to display N candidate values selected from integers in a target range having a predetermined base value as the maximum value, as candidates to be selected by a user. A display management method according to the present invention includes selecting a predetermined number of values that are multiples of a plurality of different reference values, from among integers in a target range, as candidate values; and causing a display unit to display a candidate value list that lists N candidate values that include the predetermined number of selected values.

BRIEF DESCRIPTION OF DRAWINGS

FIG. 7A is the flowchart of the process for selecting candidate values.

FIG. 7B is the flowchart of the process for selecting candidate values.

FIG. 8A is an illustrative view indicating specific examples of candidate values.

FIG. 8B is an illustrative view indicating specific examples of candidate values.

FIG. 9 is a flowchart of a process for generating a base-value distribution screen in a second embodiment.

DESCRIPTION OF EMBODIMENTS

First Embodiment

Figure 1:
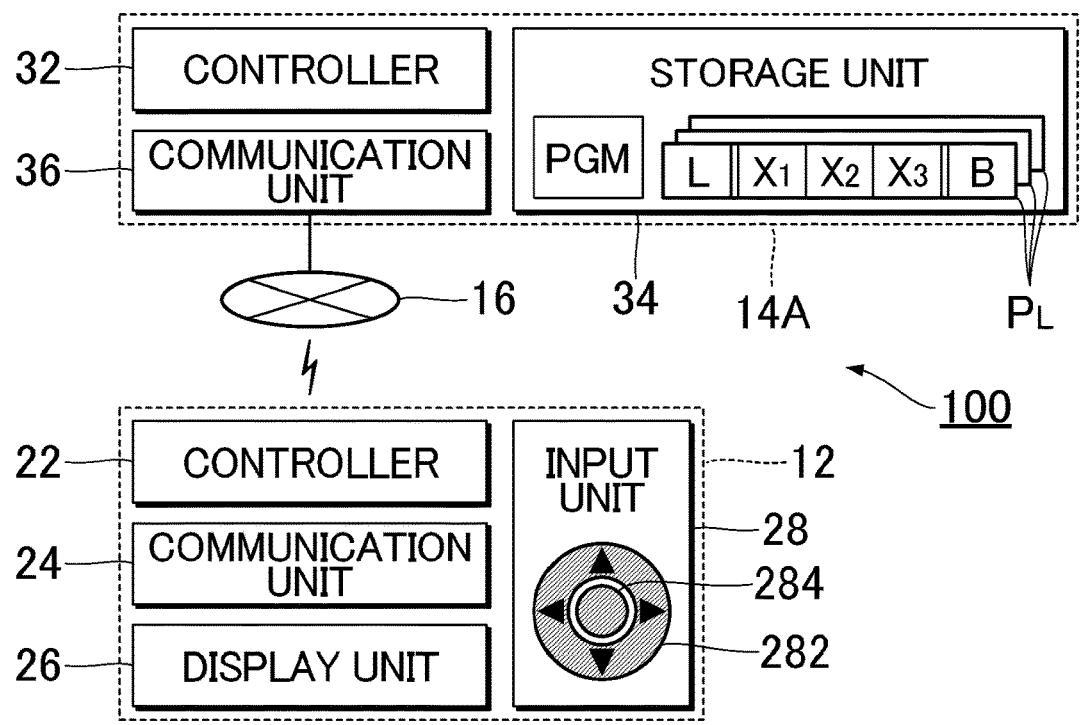
FIG. 1 is a block diagram of a game system according to a first embodiment of the present invention.

FIG. 1 is a block diagram of a game system 100 according to a first embodiment of the present invention. The game system 100 of the first embodiment includes a terminal apparatus 12 and a game apparatus 14A communicating with each other through a communication network 16 such as the Internet. The player who owns the terminal apparatus 12 plays a game. FIG. 1 shows just one terminal apparatus 12 for convenience, but actually, a plurality of terminal apparatuses 12 communicate with the game apparatus 14A through the communication network 16.

The terminal apparatus 12 is a communication terminal, such as a portable telephone or a personal digital assistant (PDA), and includes a controller 22, a communication unit 24, a display unit 26, and an input unit 28. The controller 22 comprehensively controls the units of the terminal apparatus 12. The communication unit 24 communicates with the game terminal 14A through the communication network 16. Wireless communication is typically used between the terminal apparatus 12 and the communication network 16, but wired communication is used between the terminal apparatus 12 and the communication network 16 when a desktop personal computer is used as the terminal apparatus 12, for example.

The display unit 26 (such as a liquid crystal display unit) displays various types of images under the control of the controller 22. The input unit 28 is used by the user to input an instruction to the terminal apparatus 12. As shown in FIG. 1, the input unit 28 includes a direction manipulandum (a so-called cross key) 282 with which the user can specify one of the up, down, left, and right directions according to the position pressed, and a designation manipulandum 284 with which the user designates various items.

The game apparatus 14A is a web server that provides a game for the player having the terminal apparatus 12. More specifically, the game apparatus 14A executes various processes when the terminal apparatus 12 sends a request according to an instruction given by the player to the input unit 28, for example, and causes the display unit 26 of the terminal apparatus 12 to display a game-screen web page indicating the results of the processes. In the first embodiment, the game apparatus 14A provides the terminal apparatus 12 with a browser-based game of a role-playing game (RPG) type in which a character of the player advances through the achievement of events such as searching a dungeon and battling against enemy characters.

As shown in FIG. 1, the game apparatus 14A includes a controller 32, a storage unit 34, and a communication unit 36. The controller 32 executes a program PGM to comprehensively control the units of the game apparatus 14A. The communication unit 36 communicates with the terminal apparatus 12 through the communication network 16. The storage unit 34 stores various types of data used by the controller 32 and the program PGM executed by the controller 32. As the storage unit 34, a known recording medium, such as a semiconductor recording medium or a magnetic recording medium, or a combination of a plurality of types of recording media, can be used. The storage unit 34 may be installed in an external apparatus (such as a server) separated from the game apparatus 14A, and the game apparatus 14A may acquire information from the storage unit 34 through the communication network 16. In other words, the storage unit 34 is not essential for the game apparatus 14A. The storage unit 34 (one virtual storage unit) may be realized with a plurality of units configured separately from each other.

The storage unit 34 stores, for each player, player information PL corresponding to the game progress of the player. The player information PL includes the level (level of advancement) L of the player, a plurality of types of parameters X (X1 to X3), and the base value B. The parameters X are variables applied to various types of events, such as a battle against an enemy character. For example, the health points, attack power, and defense power of the player are stored in the storage unit 34 as the parameters X.

The base value B can be distributed to the parameters X according to an instruction from the player. A predetermined value is added to the base value B when various types of events are achieved or when the level L of the player is increased, for example. The player can increase the value of a desired parameter X among the plurality types of parameters X (X1 to X3) in a desired way within the range having the base value as the maximum (that is, he or she can distribute the base value B or less to a desired parameter X). In other words, the base value B is the upper limit of an increase in parameter X.

Figure 2:
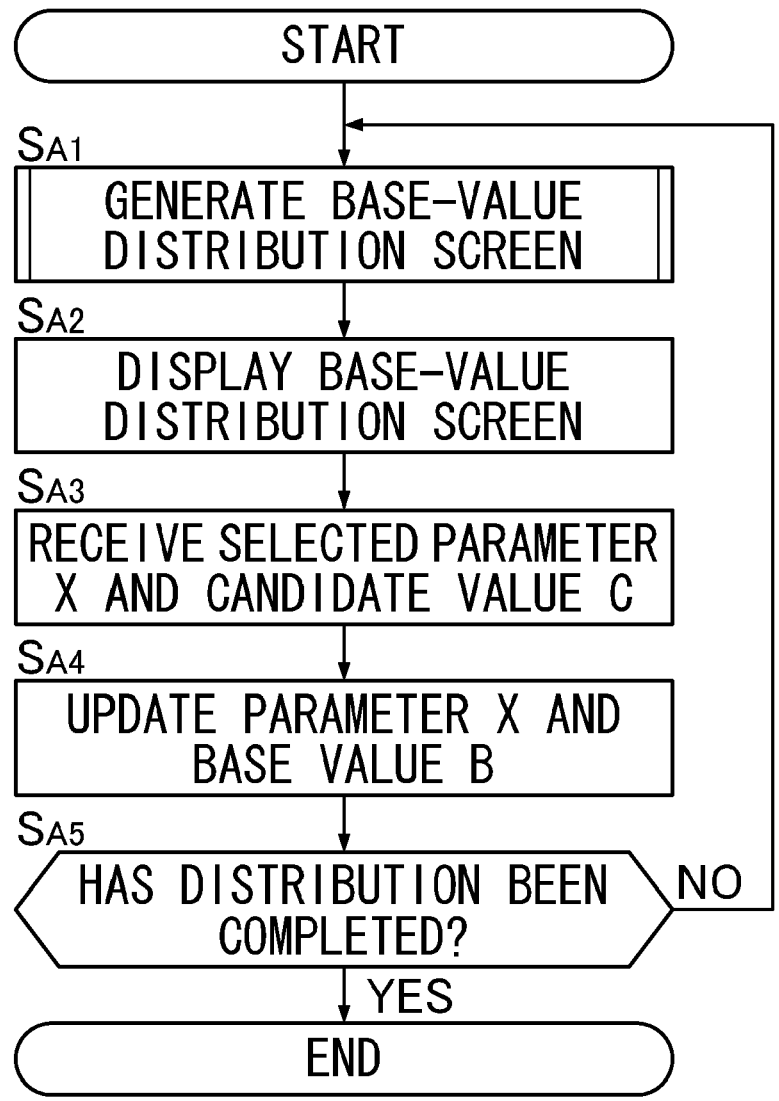
FIG. 2 is a flowchart of a process for distributing a base value to each parameter X.

FIG. 2 is a flowchart of a process for distributing the base value B to each parameter X. The controller 32 of the game apparatus 14A starts the process of FIG. 2 when the player gives an instruction for distributing the base value B to each parameter X, to the input unit 28 of the terminal apparatus 12. When the process starts, the controller 32 generates a game screen (hereafter called a base-value distribution screen) 50A in which the player selects one of the plurality types of parameters X1 to X3 to which to distribute the base value B (step SA1). The controller 32 sends screen data D for the base-value distribution screen 50A, generated in step SA1, to the terminal apparatus 12 to cause the display unit 26 of the terminal apparatus 12 to display the base-value distribution screen 50A (step SA2).

Figure 3A:
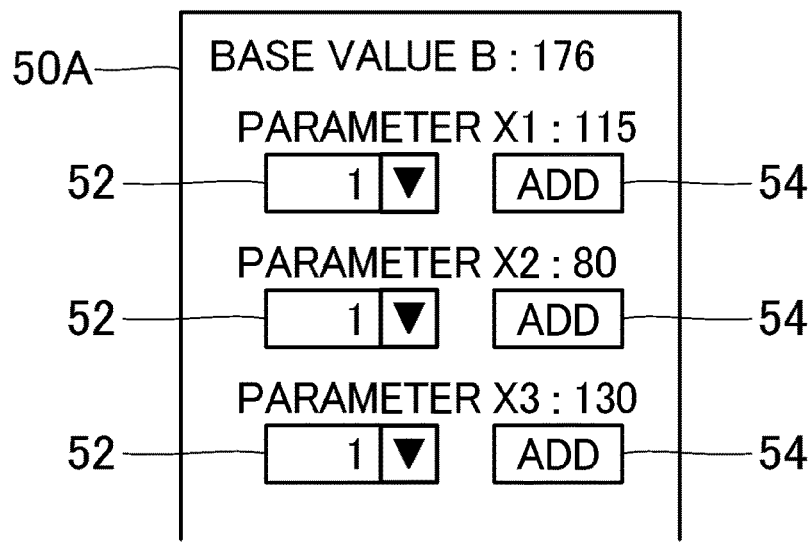
FIG. 3A is a typical view of a base-value distribution screen.
Figure 3B:
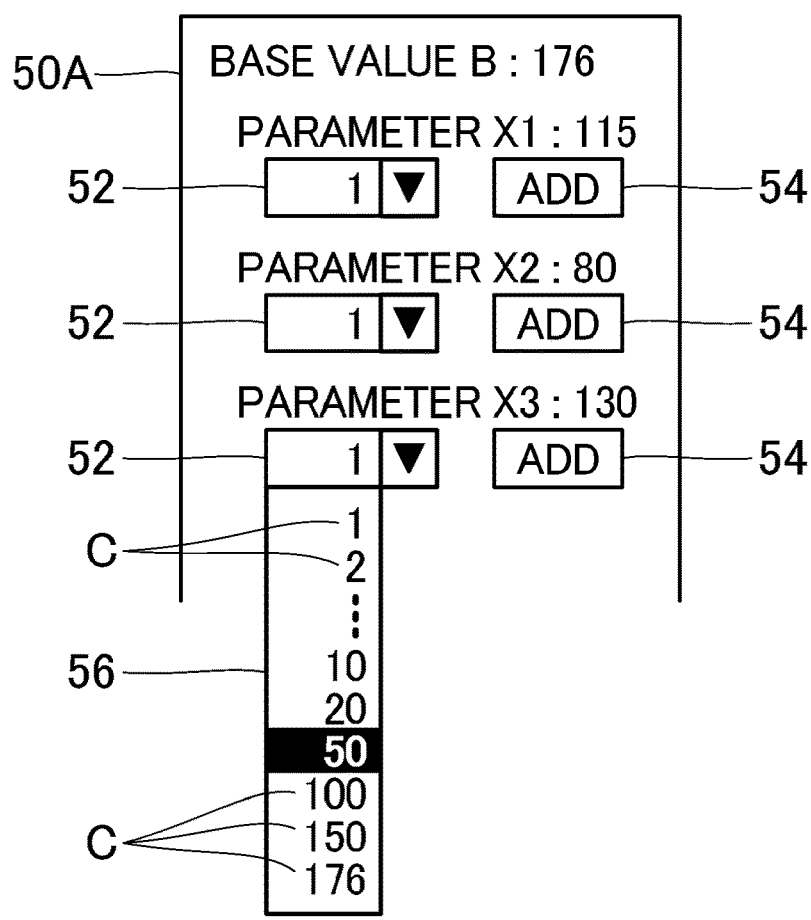
FIG. 3B is a typical view of a base-value distribution screen.
Figure 3C:
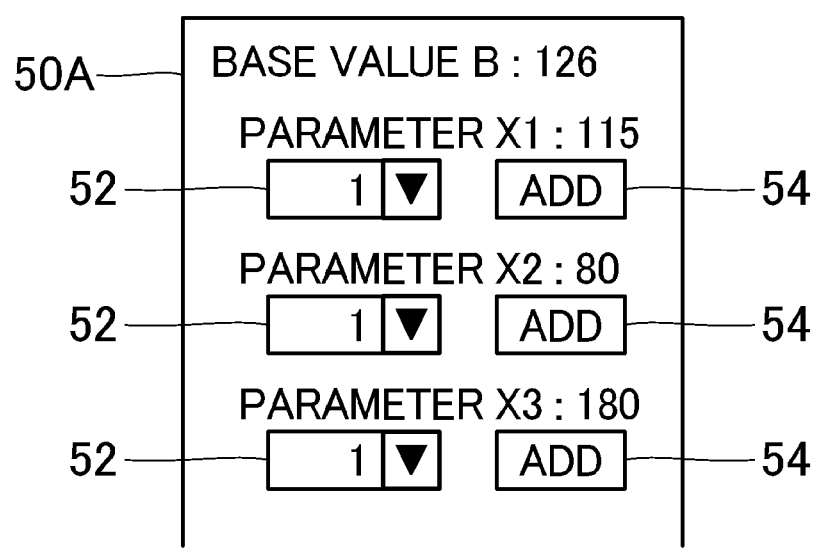
FIG. 3C is a typical view of a base-value distribution screen.

FIGS. 3A to 3C are typical views of the base-value distribution screen 50A. As shown in FIG. 3A, the base-value distribution screen 50A indicates the current value (176 in FIG. 3A) of the base value. The base-value distribution screen 50A also indicates a value selector 52, a value confirmer 54, and the current value (115 for the parameter X1, for example) of each of the plurality types of parameters X1 to X3. The value selector 52 and the value confirmer 54 are manipulators (command buttons) that receive instructions from the player.

Every time the player operates the direction manipulandum 282 of the terminal apparatus 12, each value selector 52 and each value confirmer 54 are enabled (made operable) in a predetermined order. For example, every time the player specifies the down direction with the direction manipulandum 282 when the value selector 52 for the parameter X1 is enabled, for example, the manipulators on the screen are made enable sequentially in the following order: the value selector 52 for the parameter X1, the value confirmer 54 for the parameter X1, the value selector 52 for the parameter X2, the value confirmer 54 for the parameter X2, the value selector 52 for the parameter X3, and the value confirmer 54 for the parameter X3.

The value selector 52 for each parameter X is a list box that provides the player with natural numbers in a value range (hereafter called a target range) having the base value B as the maximum, as values (hereafter called candidate values) C serving as increase candidates for the parameter X. When the designation manipulandum 284 of the input unit 28 is operated if the value selector 52 is enabled (in other words, the value selector 52 is specified), a list (hereafter called a candidate value list) 56 in which a plurality of candidate values C are vertically arranged is displayed on the display unit 26, as shown in FIG. 3B. The plurality of candidate values C are arranged in ascending order from top to bottom. The player can operate the direction manipulandum 282 appropriately when the candidate value list 56 is displayed, to select one desired candidate value C from the candidate value list 56 as an increase in the parameter X.

Figure 4:
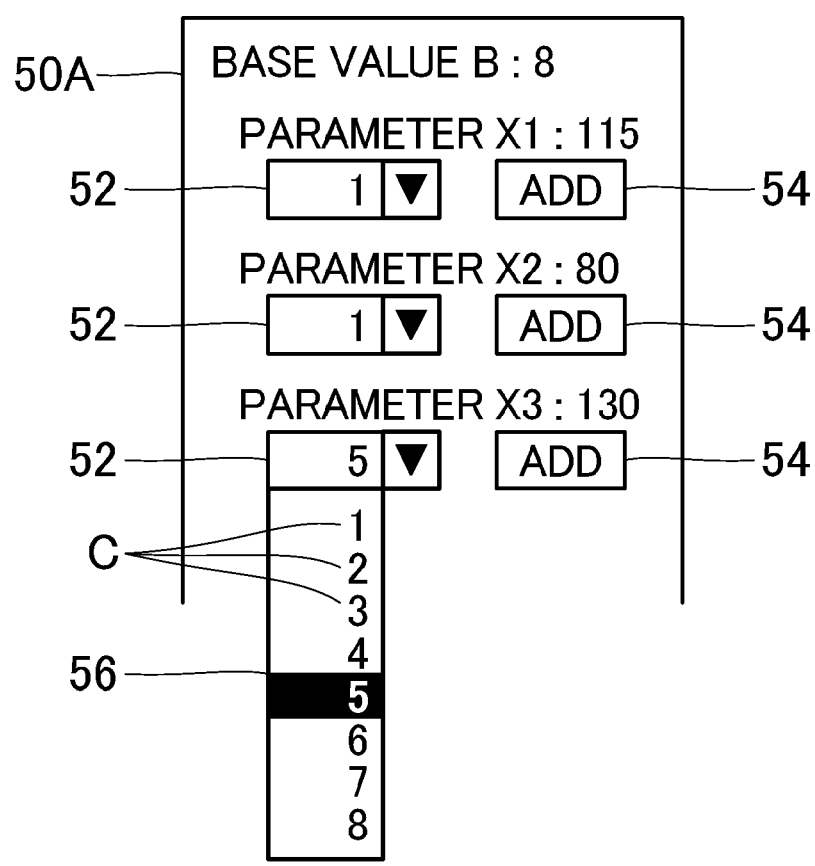
FIG. 4 is a typical view of a base-value distribution screen used when the base value is smaller than the upper limit of the number of candidate values.

N (N is a natural number equal to 2 or more) candidate values C are arranged in the candidate value list 56. When the base value B is equal to or smaller than the upper limit, N, of the number of candidate values C (B≤N), all of the B natural numbers in the target range are arranged as candidate values C in the candidate value list 56, as shown in FIG. 4. In contrast, when the base value B is larger than the upper limit, N, of the number of candidate values C (B>N), N candidate values C selected from the B natural numbers in the target range are arranged in the candidate value list 56, as shown in FIG. 3B. A method for selecting the N candidate values C will be described later.

The value confirmer 54 for each parameter X is a command button used to confirm the candidate value C selected with the value selector 52 for the parameter X as an increase in the parameter X. In other words, by operating the designation manipulandum 284 if the value confirmer 54 for one of the plurality of parameters X is enabled (in other words, by specifying the value confirmer 54), the player can select that parameter X as the distribution destination of the base value B, and when the designation manipulandum 284 is operated, can confirm the candidate value C selected with the value selector 52 for that parameter as an increase in the parameter X.

When the value confirmer 54 is operated, the parameter X and the candidate value C selected by the player are sent from the terminal apparatus 12 to the game apparatus 14A (step SA3). The controller 32 adds the candidate value C to the value, stored in the storage unit 34, of the parameter X selected by the player as the distribution destination of the candidate value C among the plurality of parameters X1 to X3, and subtracts the candidate value C (that is, an assignment given to the parameter X) from the base value B stored in the storage unit 34 (step SA4). As understood from the above description, the controller 32 functions as an element (value management section) for managing the values of the plurality of parameters X (X1 to X3) to which the base value B is distributed.

The controller 32 determines whether the distribution of the base value B has been completed (step SA5). The controller 32 determines that the distribution of the base value B has been completed when an instruction to finish distribution is given to the input unit 28 of the terminal apparatus 12 or when the base value B reaches zero when the subtraction in step SA4 is performed, for example. When the distribution of the base value B has been completed (Yes in step SA5), the controller 32 ends the process in FIG. 2.

When the distribution of the base value B has not been completed (No in step SA5), the controller 32 generates a base-value distribution screen 50A corresponding to each parameter X and the base value B updated in step SA5 and causes the display unit 26 of the terminal apparatus 12 to display the screen (steps SA1 and SA2). For example, when the base value B is set to 176 and the parameter X is set to 130, as shown in FIG. 3A, if the player selects and confirms the value 50 from the candidate value list 56 for the parameter X3, as shown in FIG. 3B, the base value B is updated to 126 (=176−50), and the parameter X3 is updated to 180 (=130+50) in the base-value distribution screen 50A, as shown in FIG. 3C.

Figure 5:
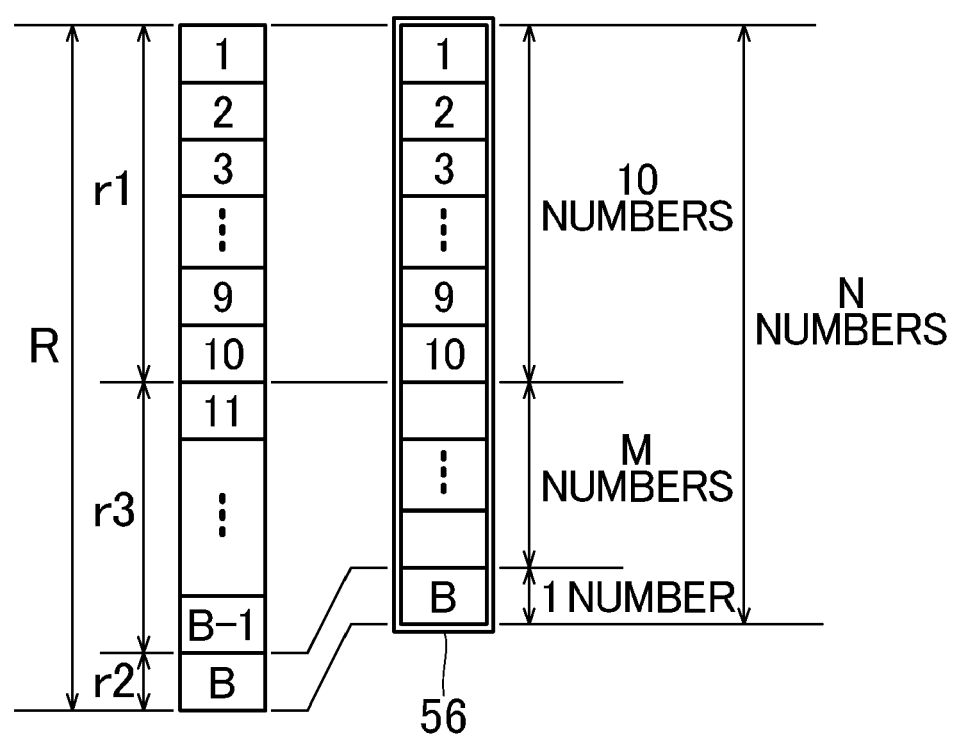
FIG. 5 is a typical view of divisions in natural numbers in a target range.

Conditions for selecting N candidate values C from B natural numbers in the target range when the base value B exceeds the upper limit, N, of the number of candidate values C in the candidate value list 56 will be described below. As shown in FIG. 5, the target range R (sequence of B natural numbers from the minimum 1 to the maximum B) having the base value B as the maximum can be divided into a first range r1, a second range r2, and a third range r3. The first range r1 is a range that includes the minimum 1 in the target range R. In the first embodiment, it is assumed here that the first range r1 is the range from the minimum 1 to 10. The second range r2 is a range that includes the maximum, which is the base value B, in the target range R. It is assumed here that the second range r2 includes only the base value B. The third range r3 (the range from 11 to (B−1)) is the range between the first range and the second range.

As shown in FIG. 5, the controller 32 arranges, in the candidate value list 56, N candidate values C formed of all ten natural numbers (1 to 10) in the first range r1, one natural number (base value B) in the second range r2, and M (M=N−10−1) natural numbers selected from the third range r3. As candidate values C, the controller 32 selects M natural numbers that are multiples of a plurality of different reference values Q among the plurality of (B−11) natural numbers in the third range r3. More specifically, in the first embodiment, the controller 32 sets the reference values Q to 1, and 100, 50, 10, and 5, which are multiples of 5, and selects M natural numbers that are multiples (excluding multiples of 100, 50, 10, and 5 from the multiples of the reference value 1) of each of the reference values Q as the candidate values C in the third range r3.

Figure 6:
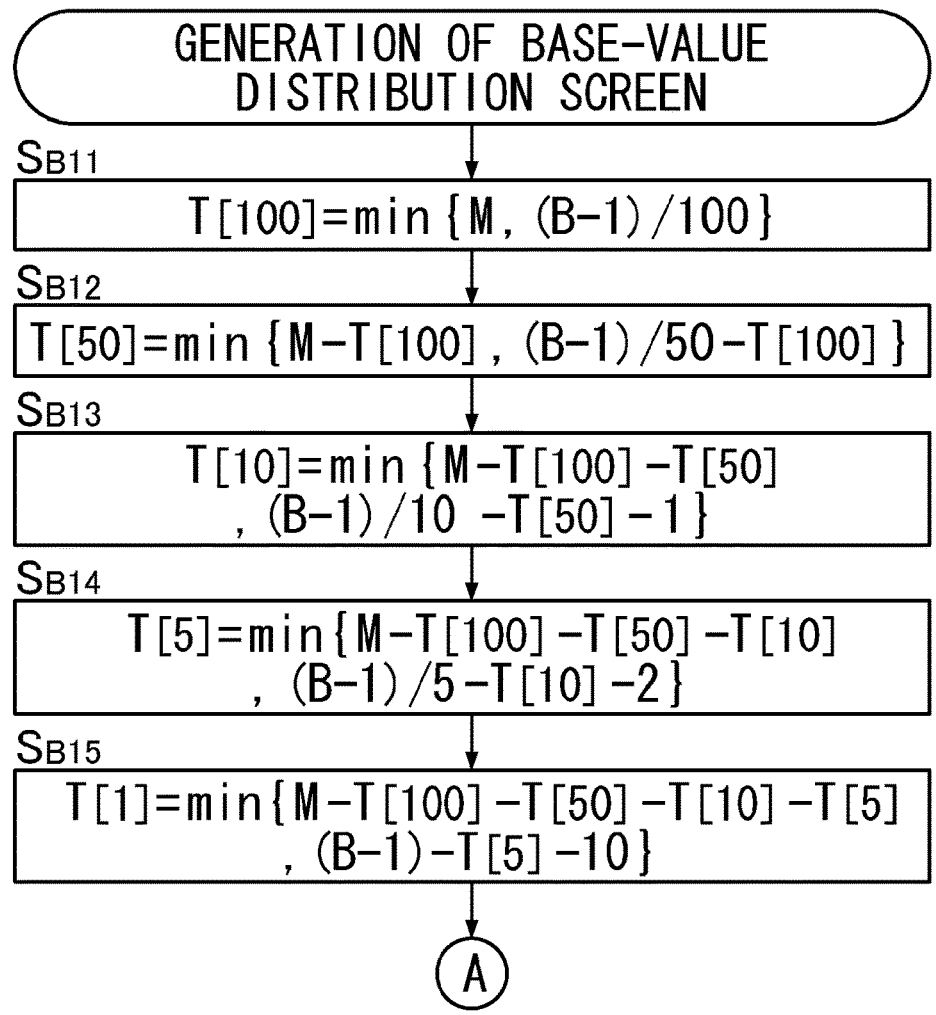
FIG. 6 is a flowchart of a process for selecting candidate values.

FIG. 6, FIG. 7A, and FIG. 7B show a flowchart of a process for generating the base-value distribution screen 50A (step SA1 in FIG. 2). When the process for generating the base-value distribution screen 50A starts, the controller 32 counts the numbers T (T[100], T[50], T[10], T[5], T[1]) of candidate values C that are multiples of the reference values Q among the plurality of natural numbers in the third range r3 such that the sum of the numbers T equals M (T[100]+T[50]+T[10]+T[5]+T[1]=M), starting from the largest of the reference values Q (steps SB11 to SB15). Here, the number T[100] indicates the number of multiples of 100 in the third range r3, and the number T[50] indicates the number of natural numbers that are multiples of 50, excluding the multiples of 100, in the third range r3. In the same way, the number T[10] indicates the number of natural numbers that are multiples of 10, excluding the multiples of 100 and the multiples of 50, in the third range r3; and the number T[5] indicates the number of natural numbers that are multiples of 5, excluding the multiples of 100, the multiples of 50, and the multiples of 10, in the third range r3. The number T[1] indicates the number of natural numbers (the multiples of 1), excluding the multiples of 100, the multiples of 50, the multiples of 10, and the multiples of 5, in the third range r3. Divisions (/) in step SB11 to SB15 indicate integer divisions (fractions are dropped in the quotients).

First, the controller 32 calculates the number T[100] of candidate values C that are multiples of 100 in the third range r3 (step SB11). More specifically, the controller 32 calculates the number T[100] in the following expression (1).

$$T[100]=\min\{M,(B-1)/100\} \quad (1)$$

The operator min{a, b} indicates the smaller of a and b. In Expression (1), {(B−1)/100} indicates the number of multiples of 100 among (B−1) natural numbers, excluding the base value B in the second range r2 from the target range R. In the first embodiment, since the first range r1 does not include any multiples of 100, {(B−1)/100} indicates the number of multiples of 100 in the third range r3. The reason why the number of multiples of 100 in the third range r3, {(B−1)/100}, is compared with the predetermined value M and the smaller of those values is selected in Expression (1) is to limit the number of candidate values C selected from the third range r3 to M even if the number of multiples of 100 in the third range r3, {(B−1)/100}, exceeds M.

The controller 32 calculates the number T[50] of candidate values C that are multiples of 50 (excluding the multiples of 100) in the third range r3 (step SB12). More specifically, the controller 32 calculates the variable T[50] in the following expression (2).

$$T[50]=\min\{M-T[100],(B-1)/50-T[100]\} \quad (2)$$

The reason why the variable T[100] is subtracted from the number of multiples of 50, {(B−1)/50}, excluding the base value B, in Expression (2) is to exclude the multiples of 100 calculated in step SB11.

The controller 32 calculates the number T[10] of candidate values C that are multiples of 10 (excluding the multiples of 100 and the multiples of 50) in the third range r3 (step SB13). More specifically, the controller 32 calculates the variable T[10] in the following expression (3).

$$T[10]=\min\{M-T[100]-T[50],(B-1)/10-T[50]-1\} \quad (3)$$

The reason why 1 is subtracted from the number of multiples of 10, {(B−1)/10}, excluding the base value B, in Expression (3) is to exclude the multiples of 10 that exist in the first range r1 (only one multiple, namely, 10).

The controller 32 calculates the number T[5] of candidate values C that are multiples of 5 (excluding the multiples of 100, the multiples of 50, and the multiples of 10) in the third range r3 (step SB14). More specifically, the controller 32 calculates the variable T[5] in the following expression (4).

$$T[5]=\min\{M-T[100]-T[50]-T[10],(B-1)/5-T[10]-2\} \quad (4)$$

The reason why 2 is subtracted from the number of multiples of 5, {(B−1)/5}, excluding the base value B, in Expression (4) is to exclude the multiples of 5 that exist in the first range r1 (two multiples, namely, 5 and 10).

The controller 32 calculates the number T[1] of candidate values C that are multiples of 1 (excluding the multiples of 100, the multiples of 50, the multiples of 10, and the multiples of 5) in the third range r3 (step SB15). More specifically, the controller 32 calculates the variable T[1] in the following expression (5).

$$T[1]=\min\{M-T[100]-T[50]-T[10]-T[5],(B-1)-T[5]-10\} \quad (5)$$

The reason why 10 is subtracted from the number of the natural numbers, (B−1), excluding the base value B, in Expression (5) is to exclude the natural numbers that exist in the first range r1 (tem numbers from 1 to 10).

Once the controller 32 calculates the numbers T (T[100], T[50], T[10], T[5], T[1]) of candidate values C that are multiples of the reference values Q in the third range r3, the controller 32 executes processes (steps SC10 to SC29) shown in FIG. 7A and FIG. 7B to search the third range r3 for M candidate values C.

As shown in FIG. 7A, the controller 32 sets a variable Z to 1 (step SC10). The variable Z sequentially specifies a natural number in the target range R. In outline, the controller 32 sequentially increments the variable Z by 1 in the target range R (step SC14) and checks whether the value of the variable Z equals the candidate value C at each stage. In step SC10, the variable Z is initialized to the minimum value 1 in the target range R.

The controller 32 determines whether the variable Z exceeds the base value B (step SC11). When the variable Z is equal to or smaller than the base value B (in other words, a natural number for which it has not yet been checked whether it is a candidate value C remains in B natural numbers in the target range R), the controller 32 determines whether the variable Z is a candidate value C (steps SC12 to SC29).

The controller 32 determines whether the variable Z is 10 or smaller, or equal to the base value B (step SC12). When the result of the determination in step SC12 is affirmative, the controller 32 confirms the variable Z as a candidate value C (step SC13). In other words, as described with reference to FIG. 5, the natural numbers from 1 to 10 in the first range r1 and the base value B in the second range r2 are selected as candidate values C in the target range R. The controller 32 adds 1 to the variable Z to select the next natural number in the target range R (step SC14), and returns to step SC11. As understood from the foregoing description, the controller 32 functions as an element (second selection section) for selecting the natural numbers (1 to 10) as candidate values C in the first range r1 of the target range R and also as an element (third selection section) for selecting the natural number (base value B) as a candidate value C in the second range r2 of the target range R.

In contrast, if the result of the determination in step SC12 is negative (that is, the variable Z is in the third range r3), the controller 32 determines whether the variable Z is a candidate value C in the third range r3, and if the variable Z is a candidate value C, confirms the variable Z as a candidate value C (steps SC15 to SC29).

First, the controller 32 determines whether the variable T[100] is a positive number and whether the variable Z is a multiple of 100 (step SC15). If the result of the determination in step SC15 is affirmative, the controller 32 confirms the variable Z as a candidate value C (a multiple of 100) (step SC16). Since the variable T[100] means the number of the remaining candidate values C that are multiples of 100 in the third range r3, when one candidate value C that is a multiple of 100 is confirmed in step SC16, the controller 32 reduces the variable T[100] by 1 (step SC17).

The same processes as in steps SC15 to SC17 are sequentially executed for each of the variables T[50], T[10], T[5], and T[1]. Specifically, if the result of the determination in step SC15 is negative, when the variable T[50] is a positive number and the variable Z is a multiple of 50 (Yes in step SC18), as shown in FIG. 7A, the controller 32 confirms the variable Z as a candidate value C (step SC19) and reduces the variable T[50] by 1 (step SC20). If the result of the determination in step SC18 is negative, when the variable T[10] is a positive number and the variable Z is a multiple of 10 (Yes in step SC21), the controller 32 confirms the variable Z as a candidate value C (step SC22) and reduces the variable T[10] by 1 (step SC23). In the same manner, if the result of the determination in step SC21 is negative, when the variable T[5] is a positive number and the variable Z is a multiple of 5 (Yes in step SC24), the controller 32 confirms the variable Z as a candidate value C (step SC25) and reduces the variable T[5] by 1 (step SC26). If the result of the determination in step SC24 is negative, when the variable T[1] is a positive number (Yes in step SC27), the controller 32 confirms the variable Z as a candidate value C (step SC28) and reduces the variable T[1] by 1 (step SC29).

When the variable Z is confirmed as a candidate value C in the above-described procedure, the controller 32 selects the next natural number in the target range R as the variable Z (step SC14), and returns to step SC11, as shown in FIG. 7A. In contrast, if the result of the determination in step SC27 is negative (that is, the variable Z is not a candidate value C), the controller 32 does not confirm the variable Z as a candidate value C but selects the next natural number as the variable Z (step SC14), and returns to step SC11. The above-described processes (steps SC15 to SC29) are repeated for each of the natural numbers in the third range r3, so that M candidate values C that are multiples of the reference values Q (Q=100, 50, 10, 5, and 1) are selected in the third range r3. In other words, the controller 32 functions as an element (first selection section) for selecting M numbers that are multiples of the plurality of different reference values Q among the natural numbers in the target range R as candidate values C.

Assuming that the number, N, of candidate values C is set to 15, specific examples of M (4) candidate values C selected in the third range r3 will be described. When the base value B is 38, the variable T[100] is set to 0 (step SB11), the variable T[50] is set to 0 (step SB12), the variable T[10] is set to 2 (step SB13), the variable T[5] is set to 2 (step SB14), and the variable T[1] is set to 0 (step SB15), as shown in FIG. 8A. Therefore, when the variable Z is 20 or 30, the result of the determination in step SC21 is affirmative, and the variable Z is confirmed as a candidate value C (step SC22); and when the variable Z is 15 or 25, the result of the determination in step SC24 is affirmative, and the variable Z is confirmed as a candidate value C (step SC25). In summary, as shown in FIG. 8A, the total of 15 candidate values C that include the numbers 1 to 10 in the first range r1, the base value B (B=38) in the second range r2, and four numbers 15, 20, 25, and 30 in the third range are displayed in the candidate value list 56.

When the base value B is 176, the variable T[100] is set to 1 (step SB11), the variable T[50] is set to 2 (step SB12), the variable T[10] is set to 1 (step SB13), the variable T[5] is set to 0 (step SB14), and the variable T[1] is set to 0 (step SB15), as shown in FIG. 8B. Therefore, when the variable Z is 100, the result of the determination in step SC15 is affirmative, and the variable Z is confirmed as a candidate value C (step SC16); when the variable Z is 50 or 150, the result of the determination in step SC18 is affirmative, and the variable Z is confirmed as a candidate value C (step SC19); and when the variable Z is 20, the result of the determination in step SC21 is affirmative, and the variable Z is confirmed as a candidate value C (step SC22). In summary, as shown in FIG. 8B, the total of 15 candidate values C that include the numbers 1 to 10 in the first range r1, the base value B (B=176) in the second range r2, and four numbers 20, 50, 100, and 150 in the third range are displayed in the candidate value list 56.

The above-described processes (from step SC11 to step SC29) are repeated. When the base value B is confirmed to be the N-th candidate value C in the target range R (step SC13), the variable Z obtained after the addition in step SC14 immediately after step SC13 exceeds the base value B. As shown in FIG. 7A, when the result of the determination in step SC11 is affirmative (that is, the processing for the B natural numbers in the target range R is completed and the N candidate values C have been confirmed), the controller 32 generates screen data D for the base-value distribution screen 50A (step SC30). The screen data D includes data indicating the base-value distribution screen 50A shown in FIG. 3A, which is an example screen, and data specifying the N candidate values C selected in the above-described procedure as the display target in the candidate value list 56. When the screen data D generated in step SC30 is sent to the terminal apparatus 12, the base-value distribution screen 50A is displayed on the display unit 26. When the player operates the value selector 52, the candidate value list 56 that includes the N candidate values C is displayed on the display unit 26. The controller 32 functions as an element (display control section) for causing the display unit 26 to display the candidate value list 56 in which the N candidate values C that include the M values selected in the third range r3 are arranged.

In the first embodiment, described above, in the target range R having the base value B as the maximum, the M values that are multiples of the different reference values Q are selected from among the B natural numbers as candidate values C; and the candidate value list 56 in which N values that include the M candidate values C are arranged is displayed on the display unit 26 of the terminal apparatus 12. With this configuration, since the number of candidate values C arranged in the candidate value list 56 is limited to an appropriate number N, the user has the advantage of being able to easily select a desired candidate value C from the candidate value list 56. Because the user needs to operate the direction manipulandum 282 to pass through candidate values C in the candidate value list 56 to finally select a target candidate value C if the user uses the terminal apparatus 12 employing the direction manipulandum 282 as the input unit 28, as in the first embodiment, the burden of the user is significantly increased if the candidate value list 56 has an excessive number of candidates C. Therefore, the first embodiment, which limits the total number of candidate values C in the candidate value list 56 to an appropriate number N, is especially effective when the candidate value list 56 is displayed on the terminal apparatus 12 having the direction manipulandum 282 as the input unit 28.

It is expected that, in a screen for allowing the user to select a desired value in the target range R, many users will add a value close to the minimum value step-by-step or will add the whole of the base value B to one parameter X. With this tendency taken into account, the natural numbers (1 to 10) in the first range r1, which includes the minimum number 1, and the base value B in the second range r2 in the target range R are always displayed in the candidate value list 56 in the first embodiment. Therefore, compared, for example, with a case in which N candidate values C selected simply at predetermined intervals in the target range R are displayed in the candidate value list 56, irrespective of the configuration in which only N candidate values C selected in the target range R are displayed in the candidate value list 56, it is highly likely that the candidate values C are values desired by the user, which is an advantage. More specifically, since the integers in the first range r1, which includes the minimum number 1, are selected as candidate values C in the target range R, when the user adds a selected candidate value C to the parameter X (X1 to X3), for example, the parameter X can be changed step-by-step. In addition, since integers in the second range r2, which includes the base value B, are selected as candidate values C in the target range R, when the user adds a selected candidate value C to the parameter X (X1 to X3), for example, the parameter X can be changed by a large amount.

Since a plurality of reference values Q include multiples of 5 (100, 50, 10, and 5) in the first embodiment, multiples of 5 (which are convenient numbers) are selected with priority in the third range r3 as candidate values C. Therefore, compared, for example, with a case in which M candidate values C are selected at random in the third range r3, an advantage is afforded in that convenient candidate values C, which are easier to select by the user, are provided.

In the first embodiment, the value selector 52 and the value confirmer 54 are displayed for each of the parameters X (X1 to X3), and the value selected from the candidate value list 56 when the user uses the value confirmer 54 is added to the parameter X (X1 to X3) corresponding to that value confirmer 54. Therefore, it is advantageous that the user can easily select the parameter X (X1 to X3) to which the base value B is distributed.

Second Embodiment

A second embodiment of the present invention will be described below. Note that, for elements in the following example embodiments having the same effects or functions as in the first embodiment, the reference symbols used in the above description will be used again, and detailed descriptions thereof will be omitted, if unnecessary.

FIG. 9 is a flowchart of a process (step SA1 in FIG. 2) for generating the base-value distribution screen 50 in the controller 32 in the second embodiment. When the process shown in FIG. 9 starts, the controller 32 determines whether the base value B of a player who has requested to display the base-value distribution screen 50 is 1 (step SD10). The controller 32 functions as an element (determination section) for determining whether the base value B is a predetermined value (1 in the second embodiment). If the result of the determination in step SD10 is negative, the controller 32 executes the same processes (steps SB11 to SB15 and steps SC10 to SC30) as in the first embodiment to generate screen data for a base-value distribution screen 50A that includes the value selector 52 and the value confirmer 54 for each of a plurality of parameters X (X1 to X3).

Figure 10:
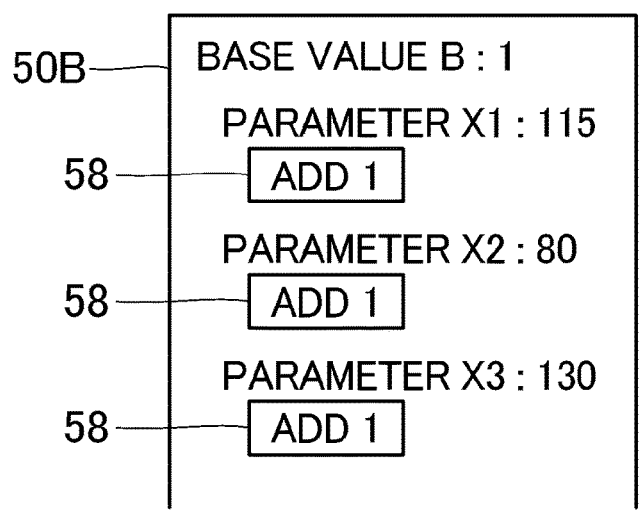
FIG. 10 is a typical view of a base-value distribution screen used when the base value is 1 in the second embodiment.

In contrast, when the result of the determination in step SD10 is affirmative (B=1), the controller 32 generates screen data D for a base-value distribution screen 50B shown in FIG. 10, which has different contents from the base-value distribution screen 50A used in the first embodiment (step SD11). When the screen data D generated in step SD11 is sent to the terminal apparatus 12, the base-value distribution screen 50B is displayed on the display unit 26 (step SA2).

As shown in FIG. 10, the base-value distribution screen 50B includes a unit value adder 58 for each of the plurality of parameters X (X1 to X3), as well as the value (1) of the base value B and the value of each parameter X. The unit value adder 58 for each parameter is a command button for the player to add 1 to the parameter X. In other words, when the base value B is 1, it is not necessary for the player to select a desired value from a plurality of candidate values C. Therefore, the candidate value list 56 is not displayed.

When the unit value adder 58 for any of the plurality of parameters X is operated, that parameter X is reported to the game apparatus 14A (step SA3). The controller 32 adds 1 to the value of the parameter X corresponding to the unit value adder 58 specified by the player among the plurality of parameters X1 to X3 stored in the storage unit 34, and reduces the base value B by 1 (step SA4). Since the base value B is updated to 0 in the subtraction in step SA4, the result of the determination in step SA5 becomes affirmative, and the processing shown in FIG. 2 (displaying the base-value distribution screen 50) ends.

The second embodiment also achieves the same advantages as the first embodiment. When the base value B is a predetermined value (1 in the foregoing example), since the unit value adder 58 for adding the predetermined value to each parameter X is displayed instead of the value selector 52 and the value confirmer 54 in the second embodiment (in other words, the number of buttons is reduced), it is advantageous that the user has less burden in selecting a parameter X to which the base value B is to be added, as indicated in the following example.

For example, a case is assumed in which 1 is added to the parameter X3 when the value selector 52 for the parameter X1 is enabled in the first embodiment, where the value selector 52 and the value confirmer 54 are displayed for each parameter X, even when the base value B is 1. The user needs to sequentially enable the manipulators in the order of the value selector 52 for the parameter X1, the value confirmer 54 for the parameter X1, the value selector 52 for the parameter X2, the value confirmer 54 for the parameter X2, the value selector 52 for the parameter X3, and the value confirmer 54 for the parameter X3, and to operate the designation manipulandum 284. In short, the user needs to perform six operations in order to add 1 to the parameter X3.

In contrast, since the unit value adder 58 is displayed for each parameter in the base-value distribution screen 50B in the second embodiment, if 1 is added to the parameter X3 when the unit value adder 58 for the parameter X1 is enabled, the user needs to sequentially enable the manipulators in the order of the unit value adder 58 for the parameter X1, the unit value adder 58 for the parameter X2, and the unit value adder 58 for the parameter X3, and to operate the designation manipulandum 284. In short, the user needs to perform three operations in order to add 1 to the parameter X3.

Third Embodiment

Figure 11:
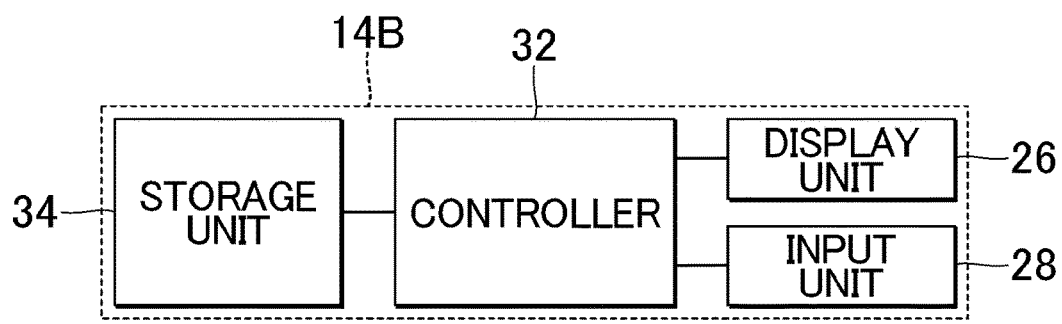
FIG. 11 is a block diagram of a game apparatus in a third embodiment.

FIG. 11 is a block diagram of a game apparatus 14B of a third embodiment. The game apparatus 14B is an electronic device on which the player plays the same game as in the first embodiment. For example, a portable device, such as a portable telephone or a personal digital assistant, is suitable as the game apparatus 14B. As shown in FIG. 11, the game apparatus 14B includes a controller 32, a storage unit 34, a display unit 26, and an input unit 28.

The storage unit 34 stores a program PGM and player information PL of the player in the same way as in the first embodiment. The controller 32 executes the program PGM to operate in the same way as in the first embodiment. More specifically, the controller 32 selects up to N candidate values C in a target range R having a base value B in the player information PL as the maximum value, and causes the display unit 26 to display a candidate value list 56 in which the candidate values C are arranged.

As understood from the foregoing description, the game apparatus 14B of the third embodiment functions as a separate unit to provide the player with the game provided by the game apparatus 14A of the first embodiment. Therefore, the third embodiment achieves the same advantages as the first embodiment. The configuration of the second embodiment, in which either the base-value distribution screen 50A or the base-value distribution screen 50B is selectively displayed depending on whether the base value B is 1 can be applied to the third embodiment.

Modifications

The foregoing embodiments can be modified in various ways. Specific example modifications will be illustrated below. Two or more modifications selected in any manner from the following example modifications can be appropriately integrated so long as no mutual contradictions exist.

(1) In the foregoing embodiments, the input unit 28 includes the direction manipulandum 282 and the designation manipulandum 284. A touch sensitive panel integrated with the display unit 26 and used to receive operation from the user may be employed as the input unit 28. When the input unit 28 includes a touch sensitive panel, since the user can specify any location in the base-value distribution screen 50 (50A or 50B), if the user touches the value confirmer 54 for the parameter X3 in the base-value distribution screen 50A in the first embodiment, a predetermined value (1, for example) is added to the parameter X3. In contrast, if the input unit 28 includes the direction manipulandum 282 and the designation manipulandum 284, it is necessary to sequentially enable the value selectors 52 and the value confirmers 54 by operating the direction manipulandum 282. With this situation taken into account, the second embodiment, in which the number of buttons displayed on the display unit 26 is reduced (only the unit value adder 58 for each parameter X is displayed) when the base value B is 1, is more suited to the configuration in which the input unit 28 includes the direction manipulandum 282 and the designation manipulandum 284 than the configuration in which the input unit 28 includes a touch sensitive panel.

(2) In the foregoing embodiments, all the natural numbers in the first range r1 (1 to 10) are selected as candidate values C. Some (either odd numbers or even numbers, for example) of the natural numbers in the first range r1 may be selected as candidate values C. The number of natural numbers in the first range r1 is appropriately changed, for example, within the range from 1 to (B−2) (the number of natural numbers obtained by excluding at least one natural number in the second range r2 and at least one natural number in the third range r3 from all of the natural numbers in the target range R). For example, the first range r1 may include only 1, which is the minimum number in the target range R. In summary, as understood from the above description, the first range r1 in the foregoing embodiments includes 1, which is the minimum value in the target range R.

(3) In the foregoing embodiments, the second range r2 includes only the base value B. However, the second range r2 may be appropriately changed. For example, the second range r2 can be set to include a plurality of natural numbers that include the base value B. When the second range r2 includes a plurality of natural numbers, some (either odd numbers or even numbers, for example) of the natural numbers in the second range r2 may be selected as candidate values C. In summary, as understood from the above description, the second range r2 in the foregoing embodiments includes the base value B, which is the maximum value in the target range R.

(4) In a configuration in which the game apparatus 14A provides the terminal apparatus 12 with a game, as in the first embodiment and the second embodiment, it is possible that the game apparatus 14A sends the base value B to the terminal apparatus 12, and the controller 22 of the terminal apparatus 12 executes the processing in FIG. 6, FIG. 7A, and FIG. 7B to select N candidate values C. The controller 22 of the terminal apparatus 12 may execute the processing in FIG. 9 to selectively display either the base-value distribution screen 50A or the base-value distribution screen 50B on the display unit 26 depending on whether the base value B is 1, in the same manner as in the second embodiment.

(5) In the foregoing embodiments, the game apparatus 14A is a single apparatus. However, the functions of the game apparatus 14A can be distributed to a plurality of apparatuses. For example, the controller 32 and the storage unit 34 may be disposed at different locations in the communication network 16 as separate apparatuses. An authentication apparatus for performing authentication for the terminal apparatus 12 may be installed between the terminal apparatus 12 and the game apparatus 14A to relay communications between the terminal apparatus 12 and the game apparatus 14A.

(6) In the foregoing embodiments, the present invention is applied to the game apparatus 14 (14A or 14B). However, the present invention can also be applied to any apparatus (display management apparatus) for displaying N candidate values C selected from integers in the target range R having a base value B as the maximum value, as candidates to be selected by the user.

DESCRIPTION OF REFERENCE NUMERALS

100: Game system
12: Terminal apparatus
14A, 14B: Game apparatus
16: Communication network
22: Controller
24: Communication unit
26: Display unit
28: Input unit
282: Direction manipulandum
284: Designation manipulandum
32: Controller
34: Storage unit
36: Communication unit
50A, 50B: Base-value distribution screen
52: Value selector
54: Value confirmer
56: Candidate value list
58: Unit value adder
C: Candidate value

The invention claimed is:

1. A display management apparatus for causing a display unit to display N candidate values selected from integers in a target range having a predetermined base value as the maximum value, as candidates to be selected by a user, the display management apparatus comprising:
at least one memory operable to store program code;
at least one processor operable to read said program code and operate as instructed by said program code;
first selection code configured to cause the at least one processor to generate a a list comprising a plurality of values that are multiples of a plurality of different reference values without intermediate values, from among the integers in the target range as candidate values, by performing an operation on the base value and the plurality of different reference values;
display control code configured to cause the at least one processor to cause the display unit to display a candidate value list that lists N candidate values that include the list comprising the plurality of values selected by the first selection code; and
value management code configured to cause the at least one processor to manage the value of each of a plurality of types of variables serving as distribution destinations of the base value,
wherein the display control code is further configured to cause the at least one processor to cause the display unit to display a value selector and a value confirmer for each of the plurality of types of variables in a state in which the user can specify, and when the user specifies the value selector, to display the candidate value list; and
when the user specifies the value confirmer, the value management section adds a candidate value selected from the candidate value list by the user to the variable corresponding to the value confirmer,
wherein N is greater than 1, and the plurality of candidate values are simultaneously displayed in the candidate value list before the user select the candidate value.

2. The display management apparatus according to claim 1, wherein the plurality of reference values include multiples of 5.

3. The display management apparatus according to claim 1, further comprising second selection code configured to cause the at least one processor to select one integer in a first range that includes 1, which is the minimum value in the target range, as a candidate value,
wherein the display control code is further configured to cause the at least one processor to cause the display unit to display the candidate value list that lists N candidate values that include the values selected by the first selection code and the value selected by the second selection code.

4. The display management apparatus according to claim 1, further comprising second selection code configured to cause the at least one processor to select all of a plurality of integers in a first range that includes 1, which is the minimum value in the target range, as candidate values,
wherein the display control code is further configured to cause the at least one processor to cause the display unit to display the candidate value list that lists N candidate values that include the values selected by the first selection code and the values selected by the second selection code.

5. The display management apparatus according to claim 1, further comprising third selection code configured to cause the at least one processor to select integers in a second range that includes the base value in the target range, as candidate values,
wherein the display control code is further configured to cause the at least one processor to cause the display unit to display the candidate value list that lists N candidate values that include the values selected by the first selection code and the values selected by the third selection code.

6. The display management apparatus according to claim 5, wherein the third selection code is further configured to cause the at least one processor to select only the base value as a candidate value.

7. The display management apparatus according to claim 1, further comprising a determination code configured to cause the at least one processor to determine whether the base value is a predetermined value,
wherein the display control code is further configured to cause the at least one processor to cause the display unit to display the value selector and the value confirmer for each of the variables when the result of the determination made by the determination code is negative, and to display, for each of the variables, a unit value adder that adds the predetermined value to the variable when the result of the determination made by the determination code is affirmative; and
when the user specifies the unit value adder, the value management code is further configured to cause the at least one processor to add the predetermined value to the variable corresponding to the unit value adder among the plurality of variables.

8. The display management apparatus according to claim 1, further comprising:
a first generator configured to generate a first set of values that are multiples of a first reference value by performing a first operation on the base value and the first reference value,
a second generator configured to generate a second set of values that are multiples of a second reference value by performing a second operation on the base value and the second reference value,
wherein the selecting code is further configured to select the first set of values and the second set of values as the list comprising the plurality of values.

9. A non-transitory computer readable medium having stored thereon a program for causing a computer to, in order to cause a display unit to display N candidate values selected from integers in a target range having a predetermined base value as the maximum value, as candidates to be selected by a user, function as:
a first selection section that generates a list comprising a plurality of values that are multiples of a plurality of different reference values without intermediate values, from among the integers in the target range as candidate values, by performing an operation on the base value and the plurality of different reference values;
a display control section that causes the display unit to display a candidate value list that lists N candidate values that include the list comprising the plurality of values selected by the first selection section; and
a value management section that manages the value of each of a plurality of types of variables serving as distribution destinations of the base value,
wherein the display control section causes the display unit to display a value selector and a value confirmer for each of the plurality of types of variables in a state in which the user can specify, and when the user specifies the value selector, to display the candidate value list; and
when the user specifies the value confirmer, the value management section adds a candidate value selected from the candidate value list by the user to the variable corresponding to the value confirmer,
wherein N is greater than 1, and the plurality of candidate values are simultaneously displayed in the candidate value list before the user select the candidate value.

10. The display management method according to claim 9, further comprising:
a first generator section that generates a first set of values that are multiples of a first reference value by performing a first operation on the base value and the first reference value,
a second generator section that generates a second set of values that are multiples of a second reference value by performing a second operation on the base value and the second reference value,
wherein the first selecting section selects the first set of values and the second set of values as the list comprising the plurality of values.

11. A display management method for causing a display unit to display N candidate values selected from integers in a target range having a predetermined base value as the maximum value, as candidates to be selected by a user, the display management method comprising:
generating, by at least one processor, a list comprising a plurality of values that are multiples of a plurality of different reference values without intermediate values, from among the integers in the target range, as candidate values, by performing an operation on the base value and the plurality of different reference values;
causing, by at least one processor, the display unit to display a candidate value list that lists N candidate values that include the list comprising the plurality of values; and
managing, by at least one processor, the value of each of a plurality of types of variables serving as distribution destinations of the base value,
wherein the operation of causing the display unit to display a candidate value list includes causing the display unit to display a value selector and a value confirmer for each of the plurality of types of variables in a state in which the user can specify, and when the user specifies the value selector, to display the candidate value list; and
when the user specifies the value confirmer, a candidate value selected from the candidate value list by the user is added to the variable corresponding to the value confirmer,
wherein N is greater than 1, and the plurality of candidate values are simultaneously displayed in the candidate value list before the user select the candidate value.

12. The display management method according to claim 11, further comprising:
generating a first set of values that are multiples of a first reference value by performing a first operation on the base value and the first reference value,
generating a second set of values that are multiples of a second reference value by performing a second operation on the base value and the second reference value,
wherein the selecting the list comprising the plurality of values comprises selecting the first set of values and the second set of values as the list comprising the plurality of values.

* * * * *